(12) United States Patent
    Adachi et al.

(10) Patent No.: US 8,319,101 B2
(45) Date of Patent: Nov. 27, 2012

(54) POLYMER BUSHING AND CABLE TERMINATION USING THE SAME

(75) Inventors: Kazuhisa Adachi, Tokyo (JP); Nobuyuki Sema, Tokyo (JP); Hitoshi Shintate, Tokyo (JP); Miyuki Ogishima, Tokyo (JP); Junichi Shinagawa, Tokyo (JP)

(73) Assignee: SWCC Showa Cable Systems Co., Ltd., Tokyo (JP)

( * ) Notice: Subject to any disclaimer, the term of this patent is extended or adjusted under 35 U.S.C. 154(b) by 134 days.

(21) Appl. No.: 12/663,624

(22) PCT Filed: Jun. 13, 2008

(86) PCT No.: PCT/JP2008/001519
§ 371 (c)(1),
(2), (4) Date: Dec. 8, 2009

(87) PCT Pub. No.: WO2009/001520
PCT Pub. Date: Dec. 31, 2008

(65) Prior Publication Data
US 2010/0175907 A1    Jul. 15, 2010

(30) Foreign Application Priority Data
Jun. 22, 2007  (JP) .................................. 2007-164902

(51) Int. Cl.
    *H02G 15/064*  (2006.01)
(52) U.S. Cl. ............... 174/73.1; 174/152 R; 174/137 R; 439/181

(58) Field of Classification Search ................. 174/73.1, 174/152 R, 15.5, 137 R, 75 R; 439/181
See application file for complete search history.

(56) References Cited

U.S. PATENT DOCUMENTS

| 6,074,229 A | 6/2000 | Johansson ..................... 439/181 |
| 6,627,820 B2 | 9/2003 | Yanagisawa et al. .......... 174/140 |
| 7,109,422 B2 * | 9/2006 | Hiroshi et al. ............... 174/73.1 |
| 7,491,885 B2 | 2/2009 | Adachi et al. ................ 174/73.1 |
| 2003/0022556 A1 | 1/2003 | Amerpohl et al. |
| 2005/0016752 A1 | 1/2005 | Hiroshi et al. |
| 2007/0000680 A1 | 1/2007 | Adachi et al. |

FOREIGN PATENT DOCUMENTS

| JP | 44009866 | 4/1969 |
| JP | 2002-135959 | 5/2002 |
| JP | 2003-303632 | 10/2003 |
| JP | 2008278601 | 11/2008 |

* cited by examiner

*Primary Examiner* — Dhirubhai R Patel
(74) *Attorney, Agent, or Firm* — Bacon & Thomas, PLLC

(57) ABSTRACT

A polymer bushing includes a conductor bar, a conductor insertion hole at a lower end, a rigid insulator around the outer circumference of the conductor bar and having a receiving port for a cable termination, a polymer covering around the outer circumference of the insulator and a number of shades 4a formed separately along the longer dimension at the outer circumference. A large diameter part is provided above the conductor insertion hole which is in the vicinity of the lower end part of the insulator. A cylindrical shielding metal fitting is concentrically embedded together with the conductor bar in the large diameter part. An electric-field stress-control layer is provided at the interface between the large diameter part and the polymer covering.

3 Claims, 5 Drawing Sheets

POLYMER BUSHING AND CABLE TERMINATION USING THE SAME

TECHNICAL FIELD

This invention relates to a polymer bushing and a cable sealing end using the polymer bushing. Particularly, it relates to a polymer bushing which is provided with an electric-field stress-control layer at an interface between an insulator such as an epoxy bushing and a polymer covering such as silicone rubber, and a cable sealing end which uses the polymer bushing.

BACKGROUND ART

Recently, from a viewpoint in which a weight saving, a streamlined design, and a miniaturization of a bushing, a shared using of the kind of the bushing, and a simplification of a working process are attempted, a polymer bushing of a solid insulation structure (completely dry type) which is directly molded onto the surface of the insulator such as the epoxy bushing by the polymer covering such as the silicone rubber is used (for example, refer to Patent document No. 1).

However, in the polymer bushing of such composition, because corona discharge occurs in an outer surface of the polymer bushing when electric field becomes high, there is a difficult point that the polymer covering deteriorates (erosion) by chemical erosion when aforementioned corona discharge occurs for long period.

For preventing the occurrence of such corona discharge, it is necessary to reduce electric field strength on surface of the polymer bushing in air. As the method for reducing such the electric field strength, (1) the method of providing the electric-field stress-control layer at the interface between the insulator and the polymer covering is known (for example, refer to Patent document No. 2), and (2) the method of thickening an outer diameter of the polymer covering is known (for example, refer to Patent document No. 3).

However, in the method of (1), although heat generation does not occur in an operating voltage of hitherto known voltage specification (66/77 kV), for example, when the operating voltage rises to about 154 kV, because the electric-field stress-control layer generates heat by switching in the aforementioned operating voltage, there is a difficult point that the problem of deterioration cannot ignore.

Here, it is understood that the above-described exothermic phenomenon is caused by the volt-ampere characteristic of the electric-field stress-control layer. That is, as shown in FIG. 4, the volt-ampere characteristic of the electric-field stress-control layer is nonlinear, and the electric current hardly flows at the operating voltage of about 66-77 kV (A part in drawing). However, the large current flows into the electric-field stress-control layer in the part that the electric field concentrates when the operating voltage exceeds about 154 kV (B part in drawing). That is, by aforementioned current, as shown in FIG. 5, it is understood that the heat generation occurs in the electric-field stress-control layer in the neighborhood of a shielding metal fitting 400 of the polymer bushing. In FIG. 5, numeral 100 shows a conductor bar, numeral 200 shows the insulator, numeral 300 shows the polymer covering, numeral 310 shows shades of the polymer covering, and numeral 500 shows the electric-field stress-control layer.

Meanwhile, in the method of (2), although it is possible to reduce the electric field strength of the surface of the polymer bushing (the part of the shade 310 of the polymer covering 300) to a certain degree, for obtaining the electric field strength which is equivalent to the method of (1), the outer diameter of the polymer covering 300 must be made large more than required. Therefore, in the method of (2), the deterioration of brine damage characteristic is caused by increase of surface area of an indoor/outdoor termination when the outer diameter of the polymer covering 300 becomes larger. And, there are difficult points that the increase of weight and the increase of cost of the cable sealing end are caused by needing more insulating materials.

[Patent document No. 1] Patent publication number 2003-303632

[Patent document No. 2] Patent publication number 2005-117806

[Patent document No. 3] Patent publication number 2002-157932

DISCLOSURE OF THE INVENTION

Problem to be Solved by the Invention

This invention was performed to solve the aforementioned difficult points. This invention has purposes to provide the polymer bushing that the prevention to the large scale of the polymer bushing and the attempt to the high voltage of the operating voltage are possible, and to provide the cable sealing end which uses the polymer bushing of this invention.

Means for Solving the Problems

The polymer bushing as first feature of this invention is provided with a conductor bar which is centrally arranged and has a conductor insertion hole at a lower end part, a rigid insulator which is provided at the outer circumference of the conductor bar and has a receiving port for a cable termination at a lower end part, and a polymer covering which is provided at the outer circumference of the insulator and that a number of shades are formed separately along the longer direction at the outer circumference. And, a large diameter part is provided at the upper part than the conductor insertion hole in the neighborhood of the lower end part of the insulator, and an electric-field stress-control layer is provided at the interface between the large diameter part and the polymer covering.

The polymer bushing as second feature of this invention is provided with a conductor bar which is centrally arranged and has a conductor insertion hole at a lower end part, a rigid insulator which is provided at the outer circumference of the conductor bar and has a receiving port for a cable termination at a lower end part, and a polymer covering which is provided at the outer circumference of the insulator and that a number of shades are formed separately along the longer direction at the outer circumference. And, a large diameter part is provided at the upper part than the conductor insertion hole in the neighborhood of the lower end part of the insulator, and an electric-field stress-control layer is provided at the interface between the large diameter part and the polymer covering, and a cylindrical shielding metal fitting is concentrically embedded together with the conductor bar at the large diameter part of the insulator.

The polymer bushing as third feature of this invention is provided with a conductor bar which is centrally arranged and has a conductor insertion hole at a lower end part, a rigid insulator which is provided at the outer circumference of the conductor bar and has a receiving port for a cable termination at a lower end part, and a polymer covering which is provided at the outer circumference of the insulator and that a number of shades are formed separately along the longer direction at the outer circumference. And, a large diameter part is provided at the upper part than the conductor insertion hole in the neighborhood of the lower end part of the insulator, and an electric-field stress-control layer is provided at the interface between the large diameter part and the polymer covering, and a tapered part whose diameter expands gently from the high-voltage side toward the low-voltage side is provided in the outer surface of the large diameter part.

The polymer bushing as fourth feature of this invention is provided with a conductor bar which is centrally arranged and has a conductor insertion hole at a lower end part, a rigid insulator which is provided at the outer circumference of the conductor bar and has a receiving port for a cable termination at a lower end part, and a polymer covering which is provided at the outer circumference of the insulator and that a number of shades are formed separately along the longer direction at the outer circumference. And, a large diameter part is provided at the upper part than the conductor insertion hole in the neighborhood of the lower end part of the insulator, and an electric-field stress-control layer is provided at the interface between the large diameter part and the polymer covering, and a cylindrical shielding metal fitting is concentrically embedded together with the conductor bar at the large diameter part of the insulator, and a tapered part whose diameter expands gently from the high-voltage side toward the low-voltage side is provided in the outer surface of the large diameter part.

The polymer bushing as fifth feature of this invention is provided with a conductor bar which is centrally arranged and has a conductor insertion hole at a lower end part, a rigid insulator which is provided at the outer circumference of the conductor bar and has a receiving port for a cable termination at a lower end part, and a polymer covering which is provided at the outer circumference of the insulator and that a number of shades are formed separately along the longer direction at the outer circumference. And, a large diameter part is provided at the upper part than the conductor insertion hole in the neighborhood of the lower end part of the insulator, and an electric-field stress-control layer is provided at the interface between the large diameter part and the polymer covering, and a cylindrical shielding metal fitting is concentrically embedded together with the conductor bar at the large diameter part of the insulator, and a tapered part whose diameter expands gently from the high-voltage side toward the low-voltage side is provided in the outer surface of said large diameter part. The tapered part is processed so as to have a curved surface of a smooth curved and convex shape.

The polymer bushing as sixth feature of this invention is provided with a conductor bar which is centrally arranged and has a conductor insertion hole at a lower end part, a rigid insulator which is provided at the outer circumference of the conductor bar and has a receiving port for a cable termination at a lower end part, and a polymer covering which is provided at the outer circumference of the insulator and that a number of shades are formed separately along the longer direction at the outer circumference. And, a large diameter part is provided at the upper part than the conductor insertion hole in the neighborhood of the lower end part of the insulator, and an electric-field stress-control layer is provided at the interface between the large diameter part and the polymer covering, and a tapered part whose diameter expands gently from the high-voltage side toward the low-voltage side is provided in the outer surface of the large diameter part. The tapered part is processed so as to have a curved surface of a smooth curved and convex shape.

The cable sealing end as seventh feature of this invention is provided with a polymer bushing according to any one of first feature to sixth feature and a cable termination, and the cable termination is installed at a receiving port of the polymer bushing.

Effect of the Invention

According to the polymer bushing of sixth feature from first feature and the cable sealing end of seventh feature of this invention, there are following effects.

First, by providing the large diameter part in the neighborhood of the shielding metal fitting where the electric field of the insulator concentrates, that is, at the upper part than the conductor insertion hole of the conductor bar in the neighborhood of the lower end part of the insulator, and by providing the electric-field stress-control layer at the interface between the aforementioned large diameter part and the polymer covering, the electric field strength on the surface of the polymer bushing in air can be reduced, and the heat generation of the electric-field stress-control layer can be prevented. Therefore, according to the cable sealing end using the polymer bushing of this invention, the prevention to the large scale of the polymer bushing and the attempt to the high voltage of the operating voltage are possible.

Second, by providing the tapered part whose diameter expands gently from the high-voltage side toward the low-voltage side in the outer surface of the large diameter part of the aforementioned insulator, the concentration of the electric field can be reduced.

Third, by giving the curved surface processing at the outer surface of the aforementioned tapered part, that is, by giving the processing so as to have the smooth curved and convex shape, the concentration of the electric field can be reduced furthermore.

Figure 1:
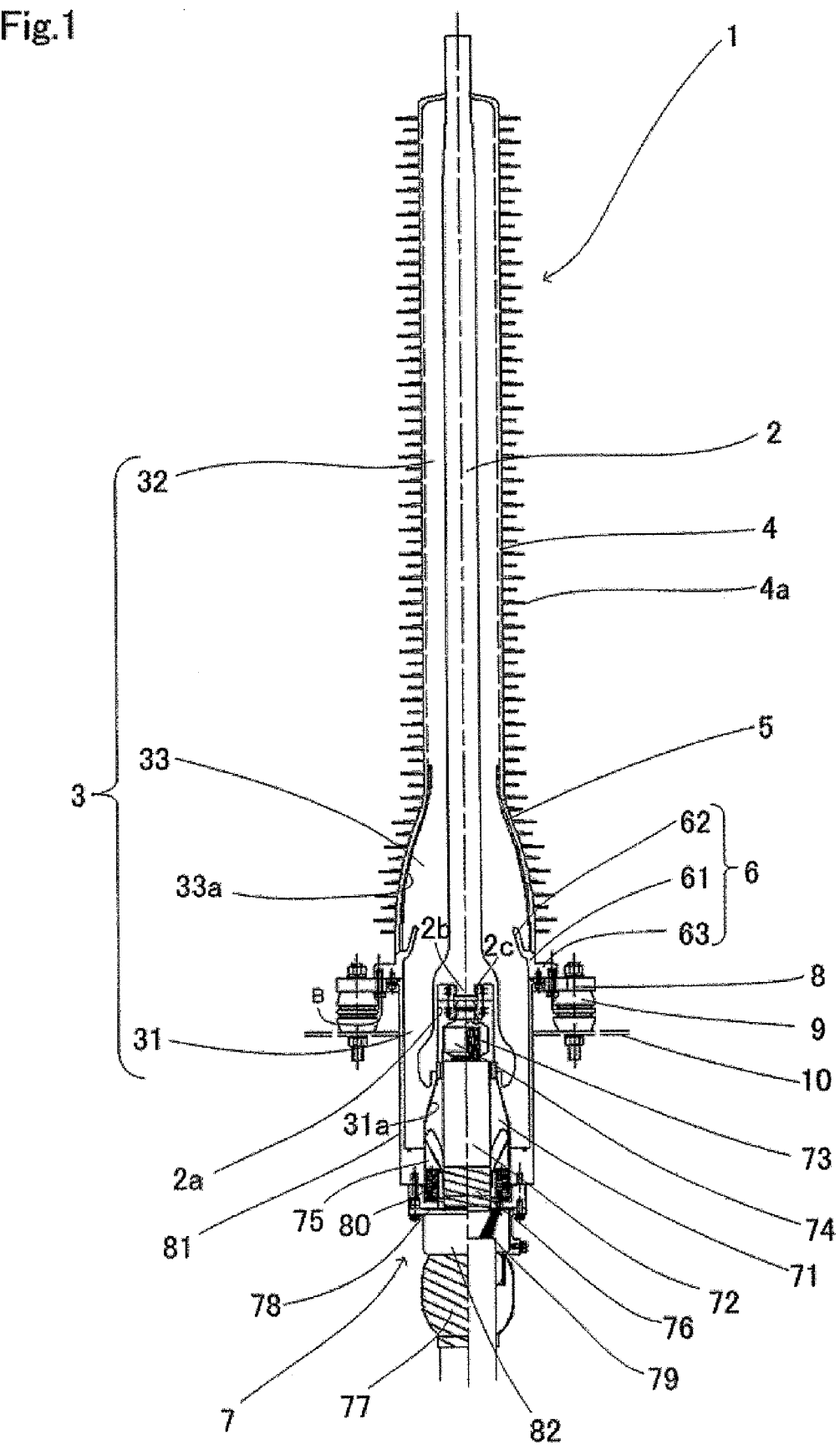
[FIG. 1] The partial sectional view of the cable sealing end of this invention.

EXPLANATION OF NUMERALS 1 polymer bushing
2 conductor bar
   2a conductor insertion hole
3 insulator
   33 large diameter part
   33a tapered part
4 polymer covering
   4a shades
5 electric-field stress-control layer
6 shielding metal fitting
7 cable termination

BEST MODE FOR CARRYING OUT THE INVENTION

Hereinafter, preferred embodiments of the polymer bushing of this invention and the cable sealing end using the polymer bushing are explained with reference to the drawings. In the following explanation, the "tip part" of the conductor bar, the insulator (including large diameter insulator, small diameter insulator and large diameter part), the shielding metal fitting (including cylindrical part and funnel-shaped part) and the electric-field stress-control layer mean the high-voltage side, and correspond to the upper direction in the drawing. Besides, the "lower end part" of the conductor bar, the insulator, the shielding metal fitting and the electric-field stress-control layer mean the low-voltage side, and correspond to the lower direction in the drawing.

FIG. 1 shows a partial sectional drawing of an indoor/outdoor termination of CV cable of 154 kV class using the polymer bushing of this invention.

In this drawing, the polymer bushing 1 of this invention is provided with the conductor bar 2 which is centrally arranged and has the conductor insertion hole 2a at the lower end part, the rigid insulator 3 which is provided at the outer circumference of the conductor bar 2, and the polymer covering 4 which is provided at the outer circumference of the insulator 3. Here, the conductor bar 2 is formed by metallic bar such as copper which is suitable for conducting current, and the insulator 3 is formed by the material having high mechanical strength, for example, rigid plastic resin such as epoxy resin or FRP. And, the polymer covering 4 is formed by the material which is superior in electric insulating performance, for example, polymer insulating material such as silicone polymer. These insulator 3, polymer covering 4 and after-mentioned electric-field stress-control layer 5 are integrally formed by molding.

The insulator 3 is provided with the large diameter insulator 31 which is provided from the lower part of the conductor insertion hole 2a at the outer circumference of the conductor insertion hole 2a of the conductor bar 2 across the lower end part of the after-mentioned shielding metal fitting 6, the small diameter insulator 32 which is provided from the neighborhood of the tip part at the outer circumference of the conductor bar 2 across the neighborhood of the upper end part of the after-mentioned shielding metal fitting 6, and the large diameter part 33 which is provided at consecutively-installed part between the large diameter insulator 31 and the small diameter insulator 32. And, the receiving port 31a which has the funnel-shaped tapered inner surface which receives a stress-relief cone 71 of the after-mentioned cable termination 7 at the lower end part of the large diameter insulator 31 is provided so that the receiving port communicates with the conductor insertion hole 2a, and is provided concentrically together with the conductor insertion hole 2a. Besides, in the outer surface of the large diameter part 33, the tapered part 33a whose diameter expands smoothly from the tip part side (high-voltage side) of itself toward the lower end part side (low-voltage side) is provided. In this embodiment, the outer surface of the aforementioned tapered part 33a has the smooth curved and convex shape by being given the curved surface processing for the section from the upper end part side to the lower end part side of the large diameter part 33. Besides, the outer diameter of the large diameter insulator 31 is 1.5-1.7 times of the outer diameter of the small diameter insulator 32, further, the outer diameter of the lower end part side of the large diameter part 33 is the almost same diameter as the outer diameter of the large diameter insulator 31, and the outer diameter of the upper end part of the large diameter part 33 is the almost same diameter as the outer diameter of the small diameter insulator 32. The lengths of the axial direction of the large diameter insulator 31 and the large diameter part 33 are respectively about 1/5 of the length of the axial direction of the insulator 3, and the length of the axial direction of the small diameter insulator 32 is about 3/5 of the length of the axial direction of the insulator 3.

Numeral 6 shows the cylindrical shielding metal fitting which surrounds the conductor bar 2 and which is concentrically embedded together with the conductor bar 2 in the large diameter part 33 of the insulator 3. And, the aforementioned shielding metal fitting 6 is provided with a cylindrical part 61 which is embedded in the consecutively-installed part between the large diameter insulator 31 and the large diameter part 33 so that only outer surface of itself is exposed, a tapered funnel-shaped part 62 which is concentrically arranged together with the cylindrical part 61 and consecutively arranged with the cylindrical part 61 in the upper end part of the cylindrical part 61 and whose upper end part of itself is turned toward the side of the small diameter insulator 32 and is concentrically embedded together with the large diameter part 33 in the large diameter part 33, and a annular flange part 63 which is concentrically arranged together with the cylindrical part 61 and consecutively arranged with the cylindrical part 61 in the lower end part of the cylindrical part 61 and which is protruded from the position of the upper end part of the large diameter insulator 31 outward in the radial direction. Here, the inner diameter of the cylindrical part 61 is the almost same diameter as the outer diameter of the large diameter insulator 31.

The polymer covering 4 is provided at the outer circumference from the lower end part of the large diameter part 33 to the tip part of the small diameter insulator 32. And, in the outer circumference of itself, a number of shades 4a are formed separately along the longer direction of the polymer covering 4. Besides, the electric-field stress-control layer 5 is provided at the interface between the large diameter part 33 and the polymer covering 4, and the lower end part side of the aforementioned electric-field stress-control layer 5 contacts electrically to the upper part of the cylindrical part 61 which constitutes the shielding metal fitting 6. Here, for example, the electric-field stress-control layer 5 is formed by high permittivity layer which composes such as ZnO layer filling the zinc oxide powder to the elastomeric material, and rubber filling conductive filler such as carbon black, and whose relative permittivity is 10 or more.

Next, the cable sealing end using the polymer bushing 1 of this invention is explained.

In FIG. 1, first, in the depth part of the conductor insertion hole 2a of the conductor bar 2, an electrical contact 2c of tulip contact type which is elastic in the radial direction is installed to the protruded columnar boss 2b to the depth wall. And, an annular bottom metal fitting 8 is fixed to the lower end surface of the outer periphery of the flange part 63 which composes the shielding metal fitting 6 by the tightening bolt B, and the aforementioned bottom metal fitting 8 is fixed to a supporting pedestal 10 through a supporting insulator 9 which is provided at the lower surface side. Consequently, the polymer bushing 1 is fixed to the supporting pedestal 10 through the supporting insulator 9. Further, the stress-relief cone 71 is installed at the outer circumference of a cable insulator 72 which is exposed by performing the step-stripped process of the cable termination, and a bullet-shaped conductor terminal 74 which is able to connect to the electrical contact 2c by plug-in system is fixed to the tip part of a cable conductor 73. Here, the stress-relief cone 71 consists of a pre-molded insulator or the like which has rubber-like elasticity such as ethylene-propylene rubber (EP rubber), and a tapered cone-shaped part which is installed at the inner wall surface of the receiving port 31a is provided at the tip part of this stress-relief cone 71.

The cable termination 7 of such composition is inserted so that the tip part turns to the receiving port 31a of the polymer bushing 1, and next, a pressure metal fitting 75 which is preliminarily arranged at the side of the cable termination 7 is pressured toward the side of the receiving port 31a. Thereby, the conductor terminal 74 is connected to the electrical contact 2c by plug-in system, and the cone-shaped part of the stress-relief cone 71 is pressed to the inner wall surface of the receiving port 31a, consequently, the insulating performance of the interface between the inner wall surface of the receiving port 31a and the outer circumference surface of the cone-shaped part is ensured.

In FIG. 1, numeral 76 shows a shielding layer of the cable, numeral 77 shows a sealing part, numeral 78 shows a pressure metal fitting flange, numeral 79 shows an earthing wire, numeral 80 shows a spring, numeral 81 shows a protective metal fitting, and numeral 82 shows an adapter.

Figure 2:
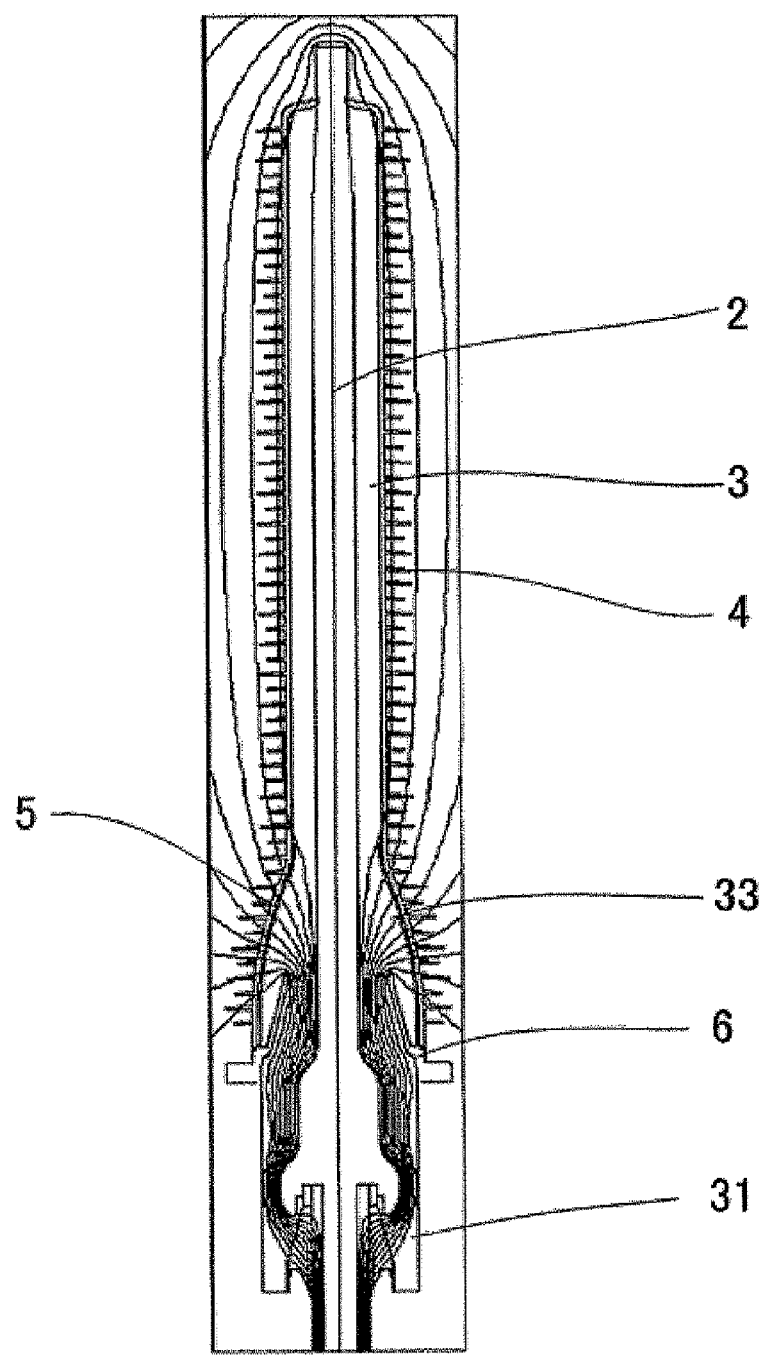
[FIG. 2] The electric field analysis diagram in the cable sealing end of this invention.
Figure 5:
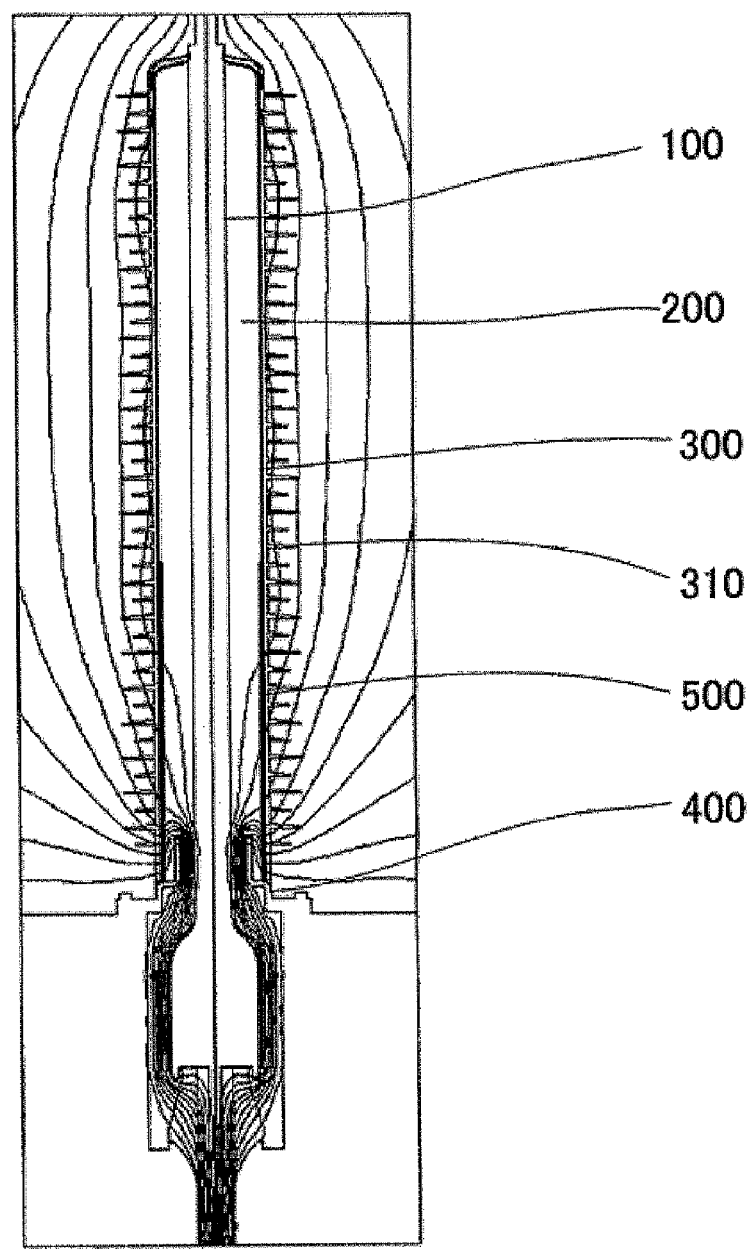
[FIG. 5] The electric field analysis diagram in the hitherto known cable sealing end.

FIG. 2 shows an electric field analysis diagram in the cable sealing end of this invention. From this drawing, as it is clear compared with the hitherto known cable sealing end (refer to FIG. 5) in the cable sealing end of this invention, it is understood that the electric field in the outer surface of the polymer bushing 1 is equalized in the neighborhood of the shielding metal fitting 6 and the concentration of the electric field is reduced.

Figure 3:
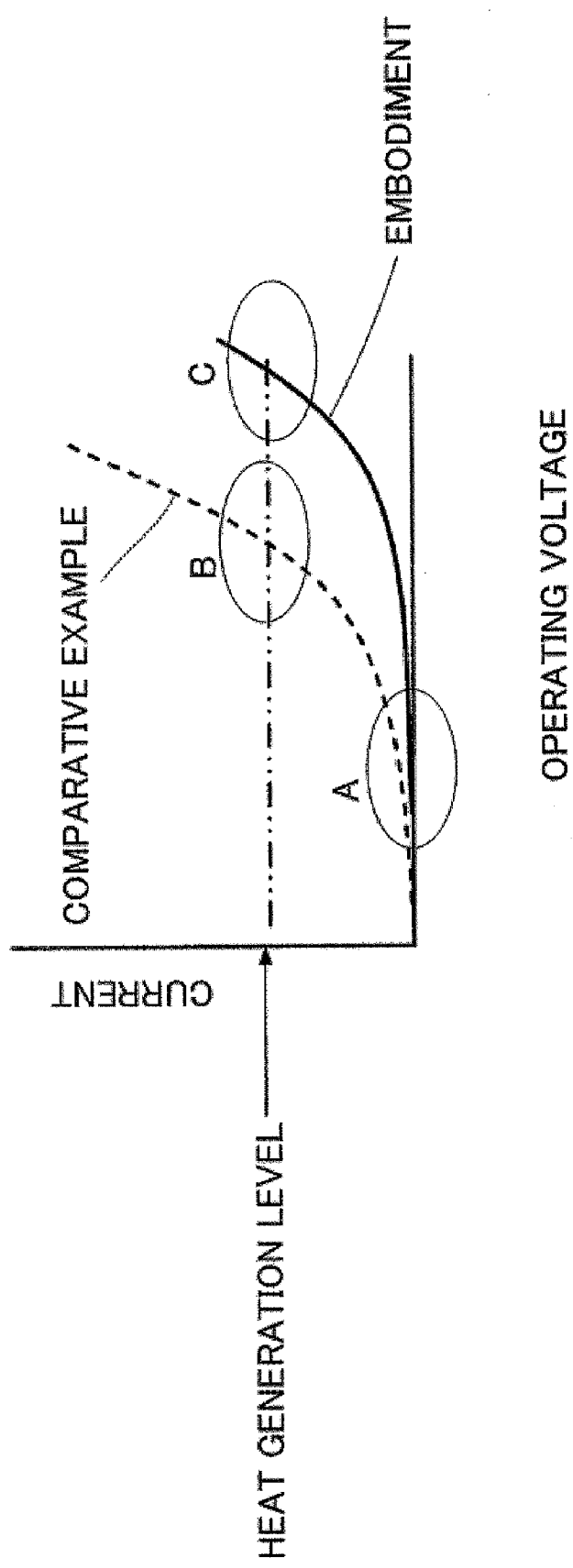
[FIG. 3] The volt-ampere characteristic diagram in the cable sealing end of this invention.
Figure 4:
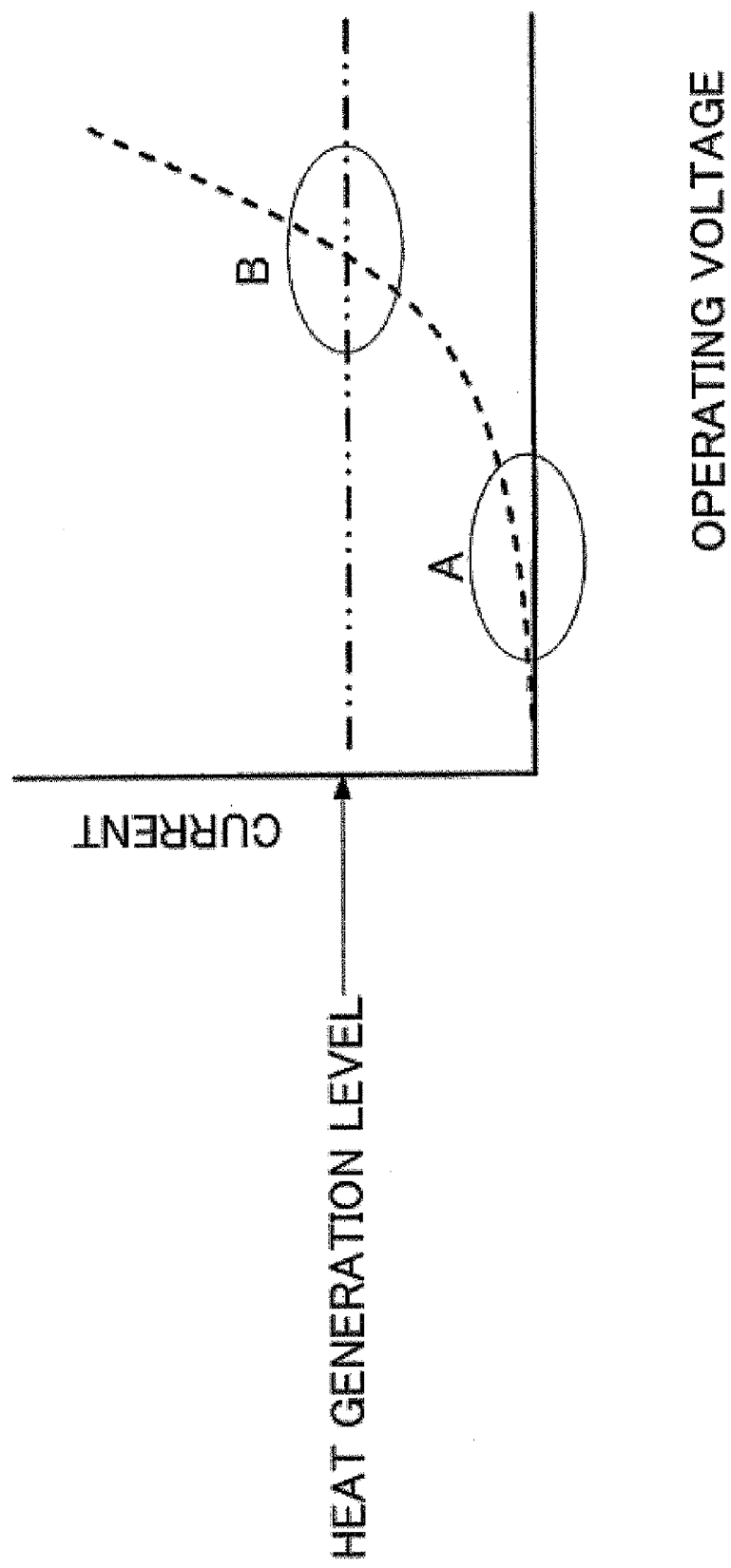
[FIG. 4] The volt-ampere characteristic diagram in the hitherto known cable sealing end.

As described above, according to the cable sealing end of this invention that the outer diameter of the insulator 3 in the neighborhood of the shielding metal fitting 6 that the electric field concentrates is made large and the electric-field stress-control layer 5 is provided at the interface between the insulator of the large diameter (large diameter part 33) and the polymer covering 4, the electric field strength on surface of the polymer bushing 1 in air can be reduced, and the heat generation of the electric-field stress-control layer 5 can be prevented. That is, as shown in FIG. 3, because the switching voltage (C part in drawing) in the cable sealing end (embodiment) of this invention becomes higher than the switching voltage (B part in drawing) in the hitherto known cable sealing end (comparative example), the heat generation of the electric-field stress-control layer 5 can be prevented. In addition, because the tapered part 33a whose diameter expands gently from the high-voltage side toward the low-voltage side is provided in the outer surface of the large diameter part 33 of the insulator 3, the concentration of the electric field can be reduced. Further, because the curved surface processing (the processing that the smooth curved and convex shape is expressed) is given at the outer surface of the aforementioned tapered part 33a if necessary, the concentration of the electric field can be reduced furthermore.

INDUSTRIAL APPLICABILITY

In the aforementioned embodiment, although this invention is explained by the particular embodiments shown in drawing, this invention is not limited to these embodiments, and, as long as the effect of this invention is shown, it is possible to perform as follows.

First, in the aforementioned embodiment, although the electric-field stress-control layer 5 is provided at the interface between the large diameter part 33 and the polymer covering 4, the aforementioned electric-field stress-control layer 5 may be provided across the outer circumference of the small diameter insulator or over the entire length of the interface.

Second, the insulator 3 which is provided at the outer circumference of the conductor bar 2 may not be molded integrally together with the conductor bar 2.

Third, although the aforementioned embodiment is explained about the indoor/outdoor termination, this invention is not limited to this embodiment. For example, this invention may be applied to such as part having shades of penetrating bushing or the like in air.

Fourth, the conductor bar 2 is not limited to the one which is formed by copper. For example, the conductor bar 2 may be formed by any one of copper alloy, aluminum or aluminum alloy.

Fifth, although the aforementioned embodiment is explained about the one that the operating voltage is 154 kV class, this invention is not limited to this embodiment. This invention may be applied to lower voltage or higher voltage than 154 kV.

The invention claimed is:

1. A polymer bushing comprising:
a rigid insulator extending along a longitudinal axis from an upper distal end to a lower end and surrounding a central conductor bar having a conductor insertion hole in the lower end and extending along the longitudinal axis, the rigid insulator having a receiving port for receiving a termination of a cable, the rigid insulator including integral small and large diameter portions, the large diameter portion including a tapered part with a diameter which increases from the small diameter portion toward the conductor insertion hole;
a polymer covering around an outer circumference of the rigid insulator, the polymer covering having a plurality of shades which are formed separately and spaced along the longitudinal axis of the rigid insulator, at an outer circumference of the polymer bushing;
an electric-field stress-control layer provided at an interface between the large diameter part and the polymer covering and composed of a zinc oxide layer or a high permittivity material having a relative permittivity of 10 or more; and
a cylindrical shielding metal fitting concentrically embedded together with the conductor bar in the large diameter portion of the rigid insulator; and
wherein the electric-field stress-control layer is in electrical contact with the cylindrical shielding metal fitting.

2. A sealed cable termination comprising a polymer bushing according to claim 1 and a cable termination inserted with the conductor insertion hole.

3. A polymer bushing according to claim 1 wherein the high permittivity material is composed of rubber containing carbon black as a conductive filler.

* * * * *